Patented Oct. 11, 1927.

1,645,389

UNITED STATES PATENT OFFICE.

KENNETH P. MONROE, OF PENNS GROVE, NEW JERSEY, ASSIGNOR TO E. I. DU PONT DE NEMOURS & COMPANY, OF WILMINGTON, DELAWARE, A CORPORATION OF DELAWARE.

PRODUCTION OF A TETRA-ALKYL LEAD.

No Drawing. Application filed October 23, 1922. Serial No. 596,514.

This invention relates to the production of a tetra-alkyl lead, and comprises treating lead, mixed with an element (for example, sodium) capable of liberating hydrogen from water, with an alkyl halide in the presence of a catalyst of the type used for the Grignard synthesis, to form a lead-alkyl halide complex associated with said element, adding water in a diluted state to the reaction mass to react with said element, thereby liberating hydrogen and effecting the reduction of said complex to a di-alkyl lead, and thermally decomposing the latter into tetra-alkyl lead.

The chief novelty in the above described process, and the feature to which the present application is primarily directed, is the addition of the water in association with certain water-soluble substances which are inert in that they have no oxidizing or reducing action, but which serve to dilute the water and, preferably, also to lower the alkalinity of the reaction mass, the purpose of diluting the water, as by solution therein of a highly soluble salt, being to mitigate the violence of the reaction between the water and the aforesaid element.

According to one proposed method of making tetra-ethyl lead, $Pb(C_2H_5)_4$, a lead-sodium alloy corresponding to the formula $PbNa_4$, is mixed with pyridine and ethyl bromide, and the mixture heated while slowly adding water equivalent to the sodium content of the lead alloy. The mechanism of this reaction, which yields tetra-ethyl lead, was not known.

This synthesis of tetra-ethyl lead may involve a reaction which is similar to the Grignard reaction, that is, a reaction yielding first a lead-ethyl bromide complex; the sodium probably functions, through its action on the water present, merely as a generator of nascent hydrogen, which in turn may react with said complex to form di-ethyl lead and hydrogen bromide, the di-ethyl lead then decomposing spontaneously into tetra-ethyl lead and metallic lead.

According to this theory of the tetra-ethyl lead synthesis, it is unnecessary to have more sodium in the lead-sodium alloy than corresponds to the formula $PbNa_2$.

As it was found when using pure water as the source of hydrogen that the reaction between the sodium of the lead-sodium alloy and the water was too violent, causing loss of hydrogen and sodium, I tried the expedient of diluting the water by the solution therein of a highly soluble salt. For this purpose potassium hydroxide, potassium carbonate, and sodium bromide were tested. All of these were found to produce the desired effect—the mitigation of the violence of the reaction between the sodium and the water with consequent increased yield based on the sodium. I also found that the amount of water necessary can be as little as 20% of that required to combine with the sodium present, as the water is continuously regenerated during the progress of the reduction by a secondary reaction between the sodium hydroxide and the hydrobromic or hydriodic acid formed. This was not true when using the tetra sodium lead alloy, as in that case sufficient water must be added to destroy the excess sodium present.

In the preceding cases the reduction mixtures in all cases are strongly alkaline due to the presence of sodium hydroxide from the sodium present in the original alloy. This alkalinity is known to be detrimental in two ways, by hydrolyzing the ethyl halide used as ethylating agent, and by destroying the lead ethyl halide complex with the formation of butane or other hydrocarbons instead of lead derivatives. I have now made the further discovery that by using, instead of water for the reduction, a mixture of water and a salt of a metal whose hydroxide is insoluble or only slightly soluble as compared with sodium hydroxide, that the yield can be materially increased by avoiding these two sources of loss. Examples of salts of such metals are magnesium and calcium chlorides, although any other salt of a metal whose hydroxide is only slightly soluble as compared with sodium hydroxide should answer the same purpose. Using this technique, any sodium hydroxide formed is converted by interaction with the other metallic salt into a soluble sodium salt and the insoluble hydroxide. In this case also, as in the preceding ones, the amount of water used can be much less than that required to combine with all the sodium, only 20% being used in actual practice.

The alkyl derivatives with which this invention is chiefly concerned are the combinations of lead with alkyls having from one to four carbon atoms, namely with methyl, ethyl, n- and iso-propyl, and n- and iso-butyl.

The alkyl halide used in the process is preferably an alkyl bromide or an alkyl iodide.

The lead alloy used should preferably be ground to increase the area of its surface.

Catalysts of the type used for the Grignard synthesis include such compounds as tertiary amines (for example, di-methyl-aniline and pyridine), esters (such as ethyl acetate), ethers, etc.

My invention may be illustrated by the following example:—

One hundred and sixty parts of coarsely (10 mesh) ground $PbNa_2$ are mixed at room temperature with 135 parts of ethyl bromide and 15 parts (all parts by weight) of pyridine. The mixture is then placed in a bath whose temperature can be controlled. With constant stirring there is then added slowly a saturated solution of magnesium chloride, approximately 8 parts of this solution being used in all. The rate of addition is controlled so that this amount of solution is added in 16 hours, the temperature being held below 35° C. The reaction takes place smoothly, with evolution of heat. When the reaction is complete, as shown by the absence of alloy in a test portion, a large excess of water (80–200 parts) is added, and the lead tetra-ethyl is steam distilled off.

The technique of the above example is for the use of magnesium salts to reduce the alkalinity. If other salts are used, the only modification necessary is to substitute the other salt for magnesium chloride. Suitable salts for use as diluents only are potassium carbonate and sodium bromide; to reduce the alkalinity, calcium or magnesium salts in general may be used. If metals other than sodium are used, the technique remains the same, except that a mixture of lead and the other metal is used instead of $PbNa_2$.

The optimum temperature for the reaction appears to be 25–30° C., although temperatures as low as 5° C. and as high as 35° C. have been employed successfully.

As indicated by the specific example given above, it is not necessary to complete the conversion of the lead into the lead-alkyl halide complex or combination before starting the reduction of the latter; in fact a considerable saving in time is effected by allowing these two reactions to proceed simultaneously, molecules of the lead-alkyl halide combination being reduced as soon as, or shortly after, they are formed.

Where the product desired is lead tetramethyl $(Pb(CH_3)_4)$, lead tetra-propyl $(Pb(C_3H_7)_4)$, or lead tetra-butyl $$(Pb(C_4H_9)_4),$$

the directions of the specific example (supra) may be followed except that instead of ethyl bromide a stoichiometrically equivalent quantity of methyl, propyl, or butyl, bromide, as the case may be, is used.

I claim:

1. The process of producing a tetra-alkyl lead which comprises treating lead, mixed with an element capable of liberating hydrogen from water, with an alkyl halide in the presence of a catalyst of the type used for the Grignard synthesis, to form a lead-alkyl halide complex associated with said element, adding water in a diluted state to the reaction mass to react with said element and cause the reduction of said complex to a di-alkyl lead, and thermally decomposing the latter into tetra-alkyl lead.

2. A process of the kind set forth in claim 1 in which sodium is the element mixed with the lead.

3. A process of the kind set forth in claim 1 in which the alkyl of the alkyl halide contains from 1 to 4 carbon atoms.

4. A process of the kind set forth in claim 1 in which the alkyl halide is ethyl bromide.

5. A process of the kind set forth in claim 1 in which the alkyl halide is an alkyl bromide.

6. A process of the kind set forth in claim 1 in which the water added contains an inert salt in solution therein.

7. A process of the kind set forth in claim 1 in which the water is diluted by having dissolved therein a metal halide.

8. A process of the kind set forth in claim 1 in which the catalyst is a tertiary amine.

9. The process of producing tetra-ethyl lead which comprises treating $PbNa_2$ with ethyl bromide in the presence of a catalyst of the type used for the Grignard synthesis, to form a lead-ethyl bromide complex associated with sodium, adding water in a diluted state to the reaction mass to generate hydrogen by reaction with the sodium, thereby reducing said complex to di-ethyl lead, and thermally decomposing the latter into tetra-ethyl lead.

10. A process of the kind set forth in claim 9 in which the water added contains an inert salt in solution therein.

11. A process of the kind set forth in claim 9 in which the water added is saturated with a highly soluble inert salt.

12. A process of the kind set forth in claim 9 in which the water is diluted by having in solution a metal halide.

13. A process of the kind set forth in claim 9 in which the water added contains in solution an alkali-forming-metal bromide.

14. A process of the kind set forth in claim 9 in which the water added contains in solution an inert salt of a metallic hydroxide, the solubility of which does not exceed that of calcium hydroxide.

15. A process of the kind set forth in claim 9 in which the water added contains in solution the halide of a metallic hydroxide, the solubility of which does not exceed that of calcium hydroxide.

16. A process of the kind set forth in claim 9 in which the water added contains in solution the halide of a metal which is a member of the group which includes calcium and magnesium.

17. A process of the kind set forth in claim 9 in which the catalyst is a tertiary amine.

18. A process of the kind set forth in claim 9 in which the quantity of water added is substantially less than the chemical equivalent of the sodium initially alloyed with the lead.

19. A process of the kind set forth in claim 9 in which the water in a diluted state is added gradually to the reaction mass so as to moderate the reaction.

20. The process of producing a tetra-alkyl lead which comprises treating a lead-sodium alloy having approximately the composition $PbNa_2$ with an alkyl halide in the presence of a catalyst of the type used for the Grignard synthesis, to form a lead-alkyl halide complex associated with said sodium, gradually adding water to the reaction mass until the lead-alkyl halide complex is reduced to a di-alkyl lead, and thermally decomposing the latter into a tetra-alkyl lead, the amount of water thus gradually added being substantially less than the chemical equivalent of the sodium initially present.

21. A process of the kind set forth in claim 20 in which the gradually added water is in a dilute state so as to moderate the reaction.

22. A process of the kind set forth in claim 20 in which the water is gradually added in the form of a saturated solution of an inert salt.

23. A process of the kind set forth in claim 20 in which the gradually added water contains in solution an inert salt of a metallic hydroxide, the solubility of which does not exceed that of calcium hydroxide.

24. A process of the kind set forth in claim 20 in which the alkyl halide is ethyl bromide, and the gradually added water contains in solution a sufficient proportion of an inert salt to highly dilute said water so as to moderate the reaction.

25. A process of the kind set forth in claim 20 in which the alkyl halide is an ethyl halide, and the gradually added water contains in solution a halide of a metallic hydroxide, the solubility of which does not exceed that of calcium hydroxide.

In testimony whereof I affix my signature.

KENNETH P. MONROE.